US012730184B2

(12) United States Patent
Sezai

(10) Patent No.: US 12,730,184 B2
(45) Date of Patent: Sep. 8, 2026

(54) RANGE MEASUREMENT DEVICE, RANGE MEASUREMENT METHOD, AND STORAGE MEDIUM

(71) Applicant: Japan Aerospace Exploration Agency, Chofu (JP)

(72) Inventor: Toshihiro Sezai, Chofu (JP)

(73) Assignee: Japan Aerospace Exploration Agency (JP)

( * ) Notice: Subject to any disclaimer, the term of this patent is extended or adjusted under 35 U.S.C. 154(b) by 520 days.

(21) Appl. No.: 17/918,233

(22) PCT Filed: Nov. 8, 2021

(86) PCT No.: PCT/JP2021/041049
§ 371 (c)(1),
(2) Date: Oct. 11, 2022

(87) PCT Pub. No.: WO2022/097749
PCT Pub. Date: May 12, 2022

(65) Prior Publication Data
US 2023/0152423 A1 May 18, 2023

(30) Foreign Application Priority Data
Nov. 9, 2020 (JP) ............................ JP2020-186767

(51) Int. Cl.
*G01S 7/292* (2006.01)
*G01S 13/28* (2006.01)

(52) U.S. Cl.
CPC .......... *G01S 7/2921* (2013.01); *G01S 13/282* (2013.01)

(58) Field of Classification Search
CPC ............................ G01S 7/2921; G01S 13/282
USPC ........................................................ 342/131
See application file for complete search history.

(56) References Cited

U.S. PATENT DOCUMENTS 6,529,794 B1 * 3/2003 Storck .................... G01S 13/34 702/194
6,657,577 B1 * 12/2003 Gregersen ............... G01V 3/12 343/793
7,289,060 B1 * 10/2007 Abatzoglou ........... G01S 7/412 342/25 R (Continued)

FOREIGN PATENT DOCUMENTS

DE 102007008944 A1 9/2007
GB 2575751 A 1/2020

(Continued)

OTHER PUBLICATIONS

Bouchard eta al. “High resolution spectrum estimation of FMCW radar signals,” IEEE Seventh SP Workshop on Statistical Signal and Array Processing, 10.1109/SSAP.1994.572532 (Year: 1994).*

(Continued)

*Primary Examiner* — Samarina Makhdoom
(74) *Attorney, Agent, or Firm* — OSTROLENK FABER LLP

(57) ABSTRACT

A range measurement device includes a signal processor configured to fit a signal, which is obtained by inverse correlating in frequency domain echo waves which are reflected by targets and returned with pulse waves which are frequency-modulated and transmitted toward the targets, with exponential functions whose arguments have real parts and imaginary parts using Prony method.

4 Claims, 3 Drawing Sheets

(56) References Cited

U.S. PATENT DOCUMENTS

| | | | | |
|---|---|---|---|---|
| 2015/0061922 | A1* | 3/2015 | Kishigami | G01S 13/48 342/147 |
| 2018/0003827 | A1* | 1/2018 | Farrokhi | G01S 5/10 |
| 2019/0295319 | A1 | 9/2019 | Pham et al. | |
| 2020/0041640 | A1 | 2/2020 | Heinen | |
| 2020/0379082 | A1 | 12/2020 | Sezai | |

FOREIGN PATENT DOCUMENTS

| | | | | | |
|---|---|---|---|---|---|
| GB | 2575751 | B | * | 2/2022 | G01S 3/58 |
| JP | 04036679 | A | | 2/1992 | |
| JP | 04072588 | A | | 3/1992 | |
| JP | 2006071618 | A | | 3/2006 | |
| JP | 5694002 | B2 | * | 4/2015 | G01S 7/32 |
| JP | 2018054514 | A | | 4/2018 | |
| JP | 2019101004 | A | | 6/2019 | |
| JP | 2019168255 | A | | 10/2019 | |
| WO | WO 2018/174172 | A1 | | 9/2018 | |
| WO | WO 2019/183278 | A1 | | 9/2019 | |
| WO | WO 2019/211923 | A1 | | 11/2019 | |

OTHER PUBLICATIONS

Extended European Search Report, dated Apr. 8, 2024, issued in corresponding European Application No. 21889300.6.

Bouchard M. et al: "High Resolution Spectrum Estimation of FMCW Radar Signals", IEEE Seventh SP Workshop on Statistical Signal and Array Processing, Jan. 1, 1994 (Jan. 1, 1994), pp. 421-424, XP093142590, DOI: 10.1109/SSAP.1994.572532, Retrieved from the Internet: URL:https://ieeexplore.ieee.org/stampPDF/getPDF.jsp?tp=&arnumber=572532&ref=.

Takashi Yoshida, Radar Engineering Revised Edition, The Institute of Electronics, Information and Communication Engineers, Corona Publishing Co., Ltd., May 25, 1999, p. 10-13, p. 274-277.

International Search Report mailed Dec. 28, 2021 in corresponding PCT International Application No. PCT/JP2021/041049.

Notice of Allowance mailed Jul. 5, 2022, in corresponding Japanese Application No. 2020-186767.

* cited by examiner

| RANKING | RELATIVE STRENGTH [dB] | RANGE [m] |
|---|---|---|
| 1 | 0.00 | 20.24 |
| 2 | -0.48 | 19.91 |
| 3 | -20.15 | 61.20 |
| 4 | -21.51 | 35.65 |
| 5 | -22.87 | 128.36 |

RANGE MEASUREMENT DEVICE, RANGE MEASUREMENT METHOD, AND STORAGE MEDIUM

REFERENCES TO RELATED APPLICATIONS

The present application is a 35 U.S.C. § 371 national stage application of PCT/JP2021/041049, filed Nov. 8, 2021, which claims priority to Japanese Patent Application No. 2020-186767, filed Nov. 9, 2020, the contents of which are incorporated herein by reference.

TECHNICAL FIELD

The present invention relates to a range measurement device, a range measurement method, and a program.

BACKGROUND ART

Pulse compression radar transmits pulse radio waves that are modulated so that the frequency linearly changes with time toward targets. When radio waves which are reflected by the targets and return to the pulse compression radar are inverse correlated with the pulse radio waves transmitted for each pulse time width, signals which have peak values at the time corresponding to twice the ranges between the radar and the targets are obtained. The pulse compression radar can measure the ranges to the targets by detecting the peak times. The above is the principle of range measurement in the pulse compression radar. At this time, assuming that the frequency change width is $\Delta f$, the range resolution $\Delta d$ is given by $\{c/(2\Delta f\}$. Here, c denotes the speed of light (see, for example, Non-Patent Literature 1). The range resolution of the pulse compression radar can be obtained by substituting $1/\Delta f$ which is the pulse width of the pulse compressed waveform into the pulse width $\tau$ of $R_{res}=c\tau/2$ in Eq. (1.14) of Non-Patent Literature 1.

CITATION LIST

Non-Patent Literature

[Non-Patent Literature 1]
Takashi Yoshida, "Revised Radar Technology," Institute of Electronics, Information and Communication Engineers, Corona Publishing Co., Ltd., May 25, 1999, pp. 10-13, pp. 274-277

SUMMARY OF INVENTION

Technical Problem

However, in the prior art, the range to the target is measured in units of the range resolution as described in Non-Patent Literature 1. Thus, in the prior art, there is a problem that range measurement accuracy and resolution are limited to the value determined from the frequency change width of the pulse compression radar.

The present invention has been made in view of the above-described problem and the objective of the present invention is to provide a range measurement device, a range measurement method, and a program which are capable of improving measurement accuracy and resolution according to the value determined from a frequency change width of transmitted radio waves.

Solution to Problem

According to an aspect of the present invention for accomplishing the above-described objective, there is provided a range measurement device including a signal processor configured to fit a signal, which is obtained by inverse correlating in frequency domain echo waves which are reflected by targets and returned with pulse waves which are frequency-modulated and transmitted toward the targets, with exponential functions whose arguments have real parts and imaginary parts using Prony method.

Also, in the range measurement device according to the aspect of the present invention, the signal processor may extract exponential functions whose absolute values of the real parts are smaller than or equal to a prescribed value from exponential functions obtained in the fitting process.

Also, in the range measurement device according to the aspect of the present invention, the signal processor may acquire values of amplitudes and values of the imaginary parts from the extracted exponential functions.

Also, in the range measurement device according to the aspect of the present invention, the signal processor may acquire values of relative amplitudes of the targets and values of ranges from exponential function information including the values of the amplitudes and the values of the imaginary parts that have been acquired.

Also, the range measurement device according to the aspect of the present invention may further include a display configured to display target information including the values of the relative amplitudes and the values of the ranges that have been acquired.

According to an aspect of the present invention for accomplishing the above-described objective, there is provided a range measurement method including transmitting, by a computer, frequency-modulated pulse waves toward targets and fitting, by the computer, a signal, which is obtained by inverse correlating in frequency domain echo waves which are reflected by the targets and returned with the transmitted pulse waves, with exponential functions whose argument have real parts and imaginary parts using Prony method.

According to an aspect of the present invention for accomplishing the above-described objective, there is provided a program for causing a computer to transmit frequency-modulated pulse waves toward targets and fit a signal, which is obtained by inverse correlating in frequency domain echo waves which are reflected by the targets and returned with the transmitted pulse waves, with exponential functions whose arguments have real parts and imaginary parts using Prony method.

Advantageous Effects of Invention

According to the present invention, measurement accuracy and resolution can be improved according to the value determined from the frequency change width of transmitted radio waves.

DESCRIPTION OF EMBODIMENTS

Hereinafter, embodiments of the present invention will be described with reference to the drawings. Also, in the following example, an example in which a range measurement device is applied to a radar device will be described.

<Example of Configuration of Range Measurement Device>

Figure 1:
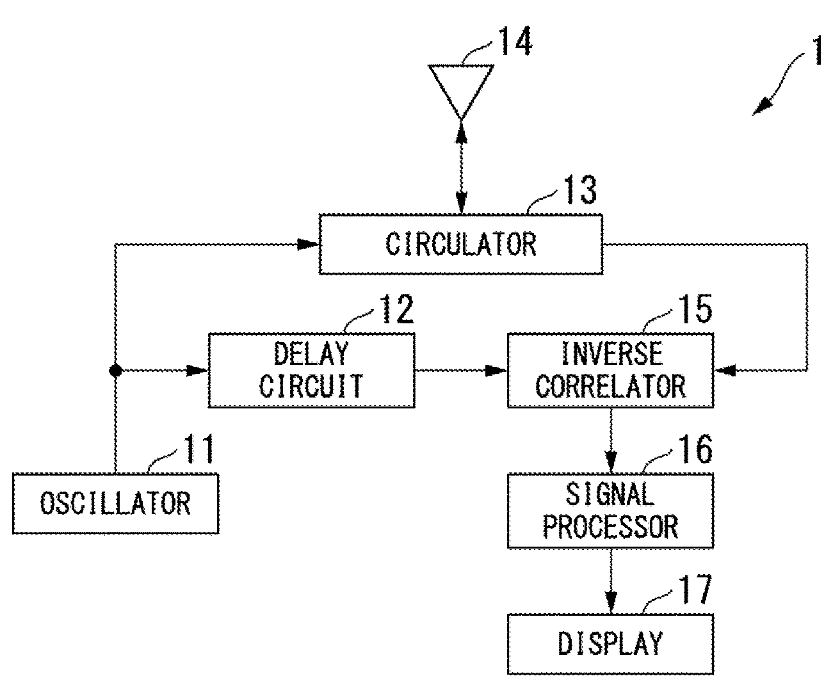
FIG. 1 is a block diagram showing an example of a configuration of a range measurement device according to an embodiment.

FIG. 1 is a block diagram showing an example of a configuration of a range measurement device according to the present embodiment. As shown in FIG. 1, a range measurement device 1 includes an oscillator 11, a delay circuit 12, a circulator 13, an antenna 14, an inverse correlator 15, a signal processor 16, and a display 17.

The range measurement device 1 is, for example, a pulse compression radar device, and measures ranges to targets by transmitting pulse radio waves (also referred to as "pulse waves") toward targets and processing a signal obtained by inverse correlating in frequency domain echo radio waves (also referred to as "echo waves") reflected by the targets with the transmitted pulse waves.

The oscillator 11 outputs the pulse radio waves that have been modulated so that the frequency linearly changes with time to the delay circuit 12 and the circulator 13.

The delay circuit 12 delays the pulse radio waves input from the oscillator 11 by the time period of integral multiplication of the pulse width including 0 times and outputs the delayed pulse radio waves to the inverse correlator 15.

The circulator 13 outputs the radio waves input from the oscillator 11 to the antenna 14. Also, the circulator 13 outputs the radio waves input from the antenna 14 to the inverse correlator 15.

The antenna 14 radiates the radio waves input from the circulator 13 toward the targets, receives returned echo radio waves that are scattered by the targets, and outputs the echo radio waves to the circulator 13. The antenna 14 can be any antenna such as a dipole antenna, a horn antenna, a parabolic antenna, or an array antenna.

The inverse correlator 15 outputs a signal, obtained by inverse correlating in the frequency domain the radio waves input from the circulator 13 with the pulse radio waves input from the delay circuit 12 to the signal processor 16.

The signal processor 16 performs a prescribed signal process and outputs values of relative amplitudes of the targets and values of ranges to the display 17.

The display 17 is, for example, a liquid crystal display device, an organic electro-luminescence (EL) display device, or the like, and displays information about the relative strength and the ranges associated with the targets based on the output from the signal processor 16.

<Example of Configuration of Signal Processor 16>

Figure 2:
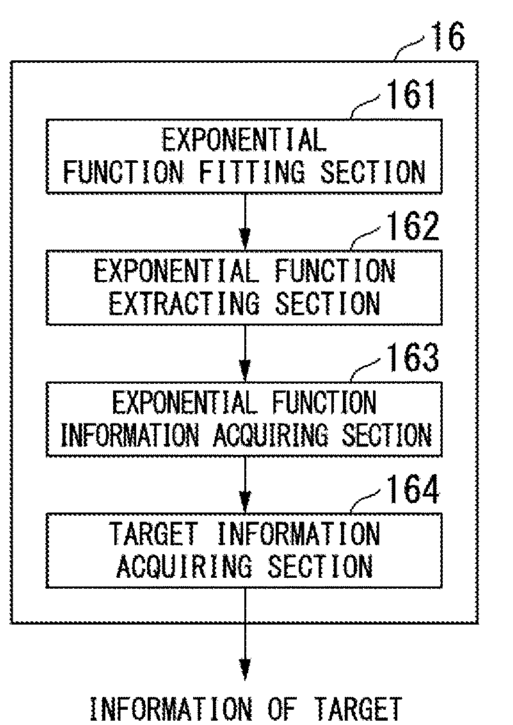
FIG. 2 is a block diagram showing an example of a configuration of a signal processor according to an embodiment.

Next, an example of a configuration of the signal processor 16 will be described. FIG. 2 is a block diagram showing an example of a configuration of the signal processor according to the present embodiment. As shown in FIG. 2, the signal processor 16 includes an exponential function fitting section 161, an exponential function extracting section 162, an exponential function information acquiring section 163, and a target information acquiring section 164.

The exponential function fitting section 161 fits an input intermediate frequency signal with exponential functions whose argument have real parts and imaginary parts using Prony method. The Prony method is a method of fitting a data series with exponential functions.

The exponential function extracting section 162 extracts exponential functions whose absolute values of the real parts are smaller than or equal to a prescribed value from exponential functions obtained in the fitting process.

The exponential function information acquiring section 163 acquires values of amplitudes and values of imaginary parts from the extracted exponential functions.

The target information acquiring section 164 acquires values of relative amplitudes of the targets and values of ranges from exponential function information that has been acquired.

<Range Measurement Method>

Next, an example of a range measurement method will be described.

A pulse compression radar transmits pulse radio waves that have been modulated so that a frequency of transmitted radio waves linearly changes with time toward targets. The transmitted radio wave signal $e_T(t)$ is expressed as follows.

[Math. 1]

$$e_T(t) = \exp\left\{j\left(2\pi f_0 t + \frac{2\pi\Delta f}{T_c}t^2\right)\right\} \tag{1}$$

In Eq. (1), j denotes an imaginary unit, t denotes time, $f_0$ denotes a carrier frequency, c denotes the speed of light, $\Delta f$ denotes a frequency change width, and $T_C$ denotes a pulse time width. Here, in order to simplify the description, a case where the target is within a range of $cT_C/2$ from the radar is considered.

Assuming that the range from the radar to the target is denoted by $R_k$, an echo signal of the target reaches the radar after a time period of $2R_k/c$, so that the echo signal $e_{R_k}(t)$ is expressed by the following Eq. (2).

[Math. 2]

$$e_{R_k}(t) = \sigma_k \cdot \exp\left(-j4\pi f_0 \frac{R_k}{c}\right) \cdot \exp\left[j\left\{2\pi f_0 t + \frac{2\pi\Delta f}{T_c}\left(t - \frac{2R_k}{c}\right)^2\right\}\right] \tag{2}$$

In Eq. (2), $\sigma_k$ denotes a scattering coefficient of the target. Also, an echo signal when there is one target is expressed in Eq. (2). Generalizing this, the echo signal $e_{R_k}(t)$ in the case of the presence of p targets is given by the following Eq. (3).

[Math. 3]

$$e_{R_k}(t) = \sum_{k=1}^{p}\left(\sigma_k \cdot \exp\left(-j4\pi f_0 \frac{R_k}{c}\right) \cdot \exp\left[j\left\{2\pi f_0 t + \frac{2\pi\Delta f}{T_c}\left(t - \frac{2R_k}{c}\right)^2\right\}\right]\right) \tag{3}$$

The inverse correlation process for the echo signal and the transmitted signal is performed by using these signals converted into a baseband. The equation for the transmitted signal $e_T(t)$ converted into a baseband signal $b_T(t)$ becomes the following Eq. (4).

[Math. 4]

$$b_T(t) = \exp\left(j\frac{2\pi\Delta f}{T_c}t^2\right) \tag{4}$$

The equation for the echo signal $e_{R_k}(t)$ converted into the baseband signal $b_{R_T}(t)$ becomes the following Eq. (5).

[Math. 5]

$$b_{R_k}(t)=\sum_{k=1}^{p}\left(\sigma_k\cdot\exp\left(-j4\pi f_0\frac{R_k}{c}\right)\cdot\exp\left[j\frac{2\pi\Delta f}{T_c}\left(t-\frac{2R_k}{c}\right)^2\right]\right)\tag{5}$$

The inverse correlation process can be performed efficiently in spectral domain, because the inverse correlation process becomes a division operation in spectral domain. The echo signal $b_{R_k}(t)$ is a signal obtained by shifting the time of the baseband signal $b_T(t)$ by $2R_k/c$ and multiplying it by a coefficient. Thus, assuming that a spectral signal of the baseband signal $b_T(t)$ is denoted by $B_T(\omega)$, the spectral signal of $b_{R_k}(t)$, $B_{R_k}(\omega)$, is expressed by the following Eq. (6) using $B_T(\omega)$.

[Math. 6]

$$B_{R_k}(\omega)=B_T(\omega)\sum_{k=1}^{p}\left\{\sigma_k\cdot\exp\left(-j4\pi f_0\frac{R_k}{c}\right)\cdot\exp\left(-j\omega\frac{2R_k}{c}\right)\right\}\tag{6}$$

The inverse correlation process is performed by dividing $B_{R_k}(\omega)$ by $B_T(\omega)$ in the spectral region. A signal obtained by dividing $B_{R_k}(\omega)$ by $B_T(\omega)$ is expressed by the following Eq. (7).

[Math. 7]

$$\left\{\frac{B_{R_k}(\omega)}{B_T(\omega)}\right\}=\sum_{k=1}^{p}\left\{\sigma_k\cdot\exp\left(-j4\pi f_0\frac{R_k}{c}\right)\cdot\exp\left(-j\omega\frac{2R_k}{c}\right)\right\}\tag{7}$$

When this signal is retransformed into time domain by Fourier transform, the inverse correlation process is completed. This is the conventional inverse correlation process.

As can be seen from Eq. (7), the signal obtained in the inverse correlation process in the spectral region is a sum of exponential functions. The signal that is actually obtained is a data series including numerical values. Prony method is known as a method of fitting a data series with exponential functions. Thus, in the present embodiment, the amplitude $\sigma_k\cdot\exp(-j4\pi f_0R_k/c)$ and the argument $(-j2R_k)/c$ of the exponential function are obtained by fitting the data series obtained in the inverse correlation process in the spectral region with the exponential functions using Prony method. Thereby, in the present embodiment, the range $R_k$ of the target can be obtained.

In this method, the range $R_k$ of the target is directly obtained numerically without being restricted by the band width of as in the conventional method, so that it can be obtained accurately.

Although Eq. (7) is an ideal equation, the signal that is actually obtained contains noise. When the actual signal is fitted using Prony method, a signal obtained by dividing $B_{R_k}(\omega)$ by $BT(\omega)$, $\{\hat{\bullet}\}$, is expressed by the following Eq. (8).

[Math. 8]

$$\left\{\frac{\hat{B}_{R_k}(\omega)}{B_T(\omega)}\right\}=\sum_{k=1}^{p}\left[\sigma_k\cdot\exp\left(-j4\pi f_0\frac{R_k}{c}\right)\cdot\exp\left\{\left(\alpha_k-j\frac{2R_k}{c}\right)\omega\right\}\right]\tag{8}$$

When the actual signal is fitted using Prony method, $\alpha_k$ is also obtained in addition to $\alpha_k\cdot\exp(-j4\pi f_0R_k/c)$ and $(-j2R_k)/c$. As shown in Eq. (7), $\alpha_k$ for the target is 0 in the ideal case, so that, when a signal containing noise is fitted using Prony method, $\alpha_k$ for the target is considered to be a small value even if it is not 0.

$\alpha_k$ for noise is not always a small value, but is considered to be any value. By utilizing this difference in a magnitude of $\alpha_k$, it is possible to efficiently extract the exponential functions for the targets from the obtained exponential functions by removing a part of the exponential functions for noise.

<Range Measurement Method>

Figures 3, 4:
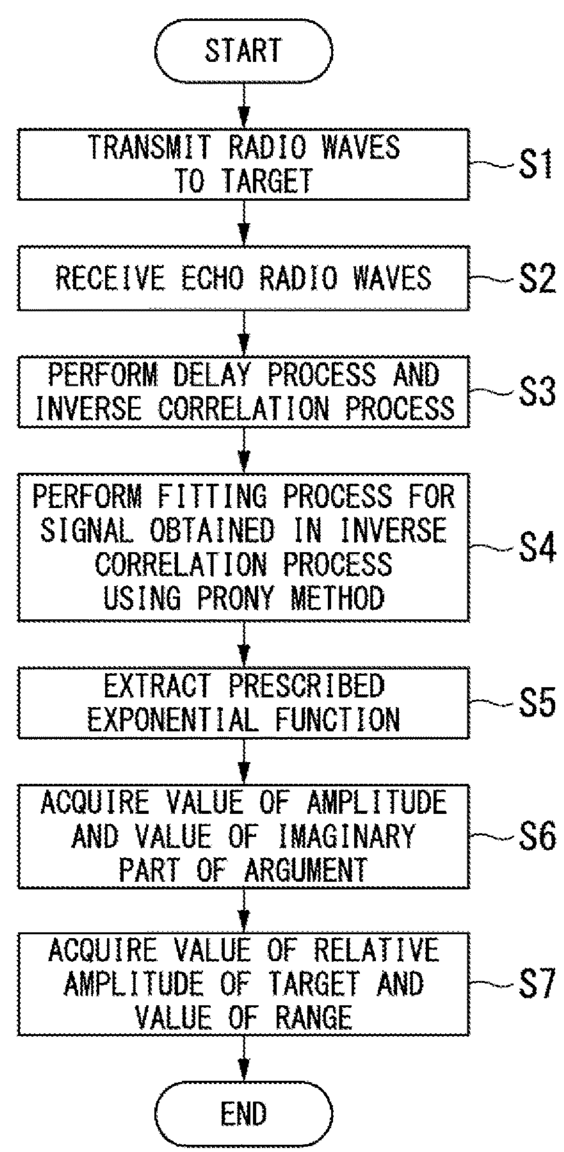
FIG. 3 is a flowchart of a range measurement processing procedure according to an embodiment.
FIG. 4 is a diagram showing information of five higher-ranked relative amplitudes within target information obtained in a simulation process.

Next, an example of a range measurement processing procedure will be described. FIG. 3 is a flowchart of the range measurement processing procedure according to the present embodiment.

(Step S1) The antenna 14 radiates radio waves input from the circulator 13 toward targets.

(Step S2) The antenna 14 receives echo radio waves that are scattered by the targets and returned.

(Step S3) The delay circuit 12 delays pulse radio waves input from the oscillator 11 by the time period of integral multiplication of the pulse width including 0 times. Subsequently, the inverse correlator 15 inverse correlates in the frequency domain the radio waves input from the circulator 13 with the pulse radio waves input from the delay circuit 12.

(Step S4) The exponential function fitting section 161 fits the signal obtained in the inverse correlation process using Prony method.

(Step S5) The exponential function extracting section 162 extracts exponential functions whose absolute values of the real parts in the arguments are smaller than or equal to a prescribed value from exponential functions obtained in the fitting process.

(Step S6) The exponential function information acquiring section 163 acquires values of amplitudes and values of imaginary parts from the extracted exponential functions.

(Step S7) The target information acquiring section 164 acquires values of relative amplitudes of the targets and values of ranges from the acquired exponential function information.

Although an example in which radio waves are transmitted and received has been described in the above-described example, the present embodiment is not limited thereto. A medium to be transmitted and received by the range measurement device is not limited to radio wave, but may be light, sound wave, or the like. As described above, the method of the present embodiment can be applied to a device that performs pulse compression even if the device transmits and receives using light or sound waves. That is, the "frequency-modulated pulse waves" are based on radio waves, light, sound waves, and the like.

<Evaluation>

Next, an example of results of a simulation performed to confirm the effect of the method of the present embodiment will be described.

The simulation conditions were that a carrier frequency was 76 [GHz] and radio waves that had been modulated so that the frequency was incremented linearly by 500 [MHz] for 1 [μsec] were transmitted from the pulse compression radar. In the simulation, target information that was obtained when the echo radio waves that were scattered from two targets with the same radar scattering cross-section located at range of 20.0 [m] and 20.2 [m] from the radar and returned to the radar were acquired in the environment in which a signal to noise ratio was 20 [dB] was studied.

A result of extracting exponential functions whose absolute values of real parts in the arguments are smaller than or equal to 0.003 from exponential functions obtained by fitting an intermediate frequency signal with exponential functions whose argument have real parts and imaginary parts using Prony method, acquiring relative amplitudes of targets from the amplitude values of the exponential functions, and acquiring ranges to the targets from the imaginary parts in the arguments of the exponential functions is shown in FIG. 4. FIG. 4 is a diagram showing information of five higher-ranked relative amplitudes within target information obtained in the simulation.

Figure 5:
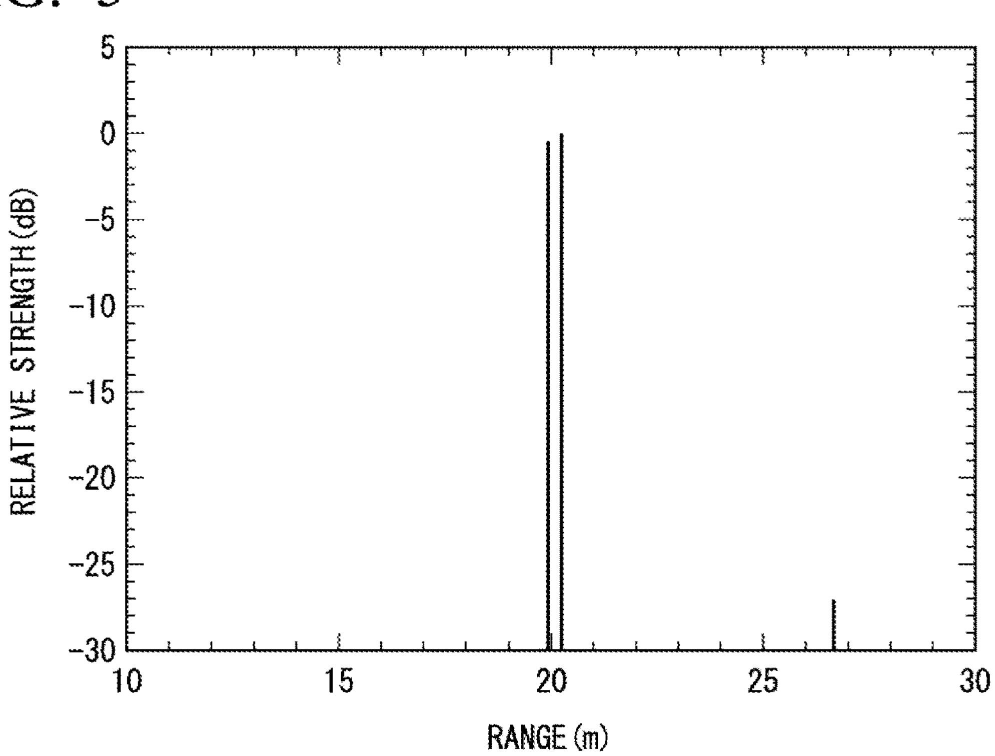
FIG. 5 is a diagram showing a relationship between a range and relative strength obtained in a simulation process according to the present embodiment.

A result of illustrating target information for the range from 10 to 30 [m] among the target information obtained in the simulation is shown in FIG. 5. FIG. 5 is a diagram showing a relationship between the range and the relative strength obtained in the simulation in the present embodiment. In FIG. 5, the horizontal axis represents a range [m] and the vertical axis represents relative strength [dB].

From FIG. 4, it can be seen that relative amplitudes of rankings 1 and 2 have a difference of 20 [dB] or more from those of rankings 3, 4, and 5, so that information associated with rankings 1 and 2 is target information and information associated with rankings 3, 4, and 5 is information caused by noise. Accordingly, it can be seen that there are two targets. The range errors between two-target information and the actual ranges are significantly small as 4 [cm] and 9 [cm]. Also, the difference between the relative amplitudes of the two targets is significantly small as 0.48 [dB].

Because the frequency change width used in the simulation is 500 [MHz], the accuracy and resolution of the range measurement obtained in the conventional method is 30 [cm]. On the other hand, according to the present embodiment, it is possible to identify two targets close to a range of 30 [cm] or less as shown in FIGS. 4 and 5. Also, the range error obtained for the two targets is 9 [cm] at the maximum, which is less than one-third of the range measurement accuracy of the conventional method. From these, according to the present embodiment, the number of targets, the range, and the relative amplitude can be obtained without being limited to the value determined from the frequency change width of the pulse compression radar system.

Figure 6:
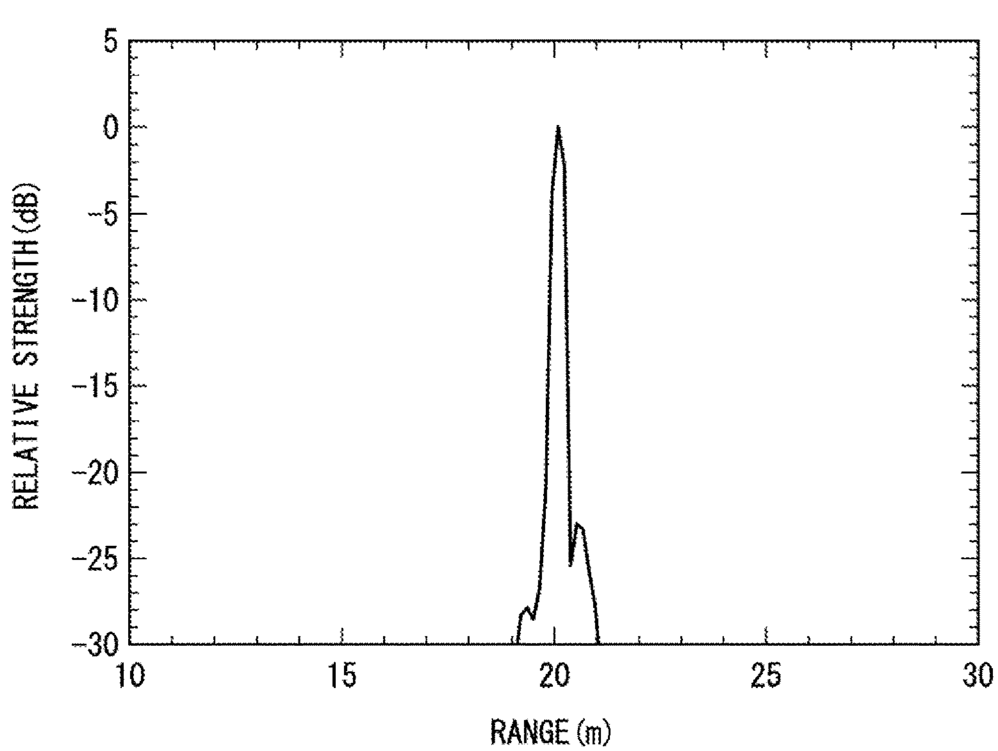
FIG. 6 is a diagram showing results of a simulation performed in the conventional method.

Here, a comparative example will be described. FIG. 6 is a diagram showing results of a simulation performed by the conventional method. In FIG. 6, the horizontal axis represents a range [m] and the vertical axis represents relative strength [dB]. The simulation conditions are the same as those of the simulation performed to confirm the effect of the method of the present embodiment. As shown in FIG. 6, in the conventional method, it is only known that the target is located in the vicinity of 20.0 [m] and it is impossible to recognize that there are two targets.

As described above, in the present embodiment, a fitting a signal, obtained by inverse correlating in a frequency domain echo radio waves with transmitted radio waves, with exponential functions whose argument have real parts and imaginary parts using Prony method is performed and exponential functions whose absolute values of the real parts in the arguments obtained in the fitting process are smaller than or equal to a prescribed value are extracted. In the present embodiment, values of the amplitudes and values of the imaginary parts in the arguments are acquired from the extracted exponential functions and values of relative amplitudes of the targets and values of ranges are acquired from acquired exponential function information.

Thereby, according to the present embodiment, measurement accuracy and resolution can be improved according to the value determined from a frequency change width of transmitted radio waves.

Also, all or some processes to be performed by the range measurement device 1 may be performed by recording a program for implementing some or all functions of the range measurement device 1 according to the present invention on a computer-readable storage medium and causing a computer system to read and execute the program recorded on the storage medium. The "computer system" used here is assumed to include an operating system (OS) and hardware such as peripheral devices. Also, the "computer system" is assumed to include a homepage providing environment (or a displaying environment) when a World Wide Web (WWW) system is used. Also, the "computer-readable storage medium" refers to a storage device such as a flexible disc, a magneto-optical disc, a read-only memory (ROM), a portable medium such as a compact disc-ROM (CD-ROM), and a hard disk embedded in the computer system. Furthermore, a "computer-readable recording medium" is assumed to include a medium for retaining a program for a given period of time such as a volatile memory (RAM) inside a computer system that serves as a server or client when a program is transmitted via a network such as the Internet or a communication circuit such as a telephone circuit.

Also, the above-described program may be transmitted from a computer system storing the program in a storage device or the like to another computer system via a transmission medium or by transmission waves in a transmission medium. Here, the "transmission medium" for transmitting the program refers to a medium which has a function of transmitting information as in a network (a communication network) such as the Internet or a communication circuit (a communication line) such as a telephone circuit. Also, the above-described program may be a program for implementing some of the above-described functions. Further, the above-described program may be a program capable of implementing the above-described function in combination with a program already recorded on the computer system, i.e., a so-called differential file (differential program).

While modes for carrying out the present invention have been described using embodiments, the present invention is not limited to such embodiments in any way and various modifications and replacements can be added without departing from the scope of the present invention.

REFERENCE SIGNS LIST

1 Range measurement device
11 Oscillator
12 Delay circuit
13 Circulator
14 Antenna
15 Inverse correlator
16 Signal processor
17 Display
161 Exponential function fitting section
162 Exponential function extracting section
163 Exponential function information acquiring section
164 Target information acquiring section

The invention claimed is:

1. A range measurement device comprising:

a transmitter configured to transmit, toward targets, pulse waves which have been frequency modulated;

a receiver configured to receive echo waves which are the pulse waves reflected by the targets and returned from the targets; and a signal processor configured to:

obtain a signal by inverse correlating in frequency domain a second baseband signal with a first baseband signal;

fit the signal with exponential functions whose arguments have real parts and imaginary parts using Prony method;

remove a part of exponential functions which have greater absolute values of the real parts than a prescribed value, as noise, among the exponential functions obtained by fitting the signal;

acquire values of amplitudes and values of the imaginary parts from the exponential functions from which the noise has been removed;

acquire values of relative amplitudes of the targets and values of ranges of the targets from the range measurement device, from exponential function information including the values of the amplitudes and the values of the imaginary parts that have been acquired, and update the values of ranges of the targets from the range measurement device, wherein the first baseband signal is a baseband signal converted from the pulse waves, wherein the second baseband signal is a baseband signal converted from the echo waves, and wherein the signal processor is configured improve measurement accuracy and resolution, and to obtain a number of targets, the values of ranges of the targets, and the value of the relative amplitude without being limited to a value determined from a frequency change width of transmitted waves.

2. The range measurement device according to claim 1, further comprising a display configured to display target information including the values of the relative amplitudes and the values of the ranges that have been acquired.

3. A range measurement method executed by a computer, the method comprising:

transmitting, by a transmitter of a range measurement device, toward targets, pulse waves which have been frequency modulated;

receiving, by a receiver of the range measurement device, echo waves which are the pulse waves reflected by the targets and returned from the targets;

obtaining a signal by inverse correlating in frequency domain a second baseband signal with a first baseband signal;

fitting the signal with exponential functions whose argument have real parts and imaginary parts using Prony method;

removing a part of exponential functions which have greater absolute values of the real parts than a prescribed value, as noise, among the exponential functions obtained by fitting the signal;

acquiring values of amplitudes and values of the imaginary parts from the exponential functions from which the noise has been removed;

acquiring values of relative amplitudes of the targets and values of ranges of the targets from the range measurement device, from exponential function information including the values of the amplitudes and the values of the imaginary parts that have been acquired, and updating the values of ranges of the targets from the range measurement device, wherein the first baseband signal is a baseband signal converted from the pulse waves, wherein the second baseband signal is a baseband signal converted from the echo waves, and wherein the range measurement method improves measurement accuracy and resolution, and to obtain a number of targets, the values of ranges of the targets, and the value of the relative amplitude without being limited to a value determined from a frequency change width of transmitted waves.

4. A computer-readable, non-transitory, storage medium storing a program for causing a computer to:

transmit, by a transmitter of a range measurement device, toward targets, pulse waves which have been frequency modulated;

receive, by a receiver of the range measurement device, echo waves which are the pulse waves reflected by the targets and returned from the targets;

obtain a signal by inverse correlating in frequency domain a second baseband signal with a first baseband signal;

fit the signal with exponential functions whose arguments have real parts and imaginary parts using Prony method;

remove a part of exponential functions which have greater absolute values of the real parts than a prescribed value, as noise, among the exponential functions by fitting the signal;

acquire values of amplitudes and values of the imaginary parts from the exponential functions from which the noise has been removed;

acquire values of relative amplitudes of the targets and values of ranges of the targets from the range measurement device, from exponential function information including the values of the amplitudes and the values of the imaginary parts that have been acquired, and update the values of ranges of the targets from the range measurement device, wherein the first baseband signal is a baseband signal converted from the pulse waves, wherein the second baseband signal is a baseband signal converted from the echo waves, and wherein the program causes the computer to improve measurement accuracy and resolution, and to obtain a number of targets, the values of ranges of the targets, and the value of the relative amplitude without being limited to a value determined from a frequency change width of transmitted waves.

* * * * *